Oct. 18, 1927.

G. P. BUTLER 1,646,008

INDEX MEMORANDUM AND REFERENCE EQUIPMENT

Filed Sept. 2, 1922     6 Sheets-Sheet 1

INVENTOR.
George P. Butler,
BY
Jesse A. Holton
ATTORNEY.

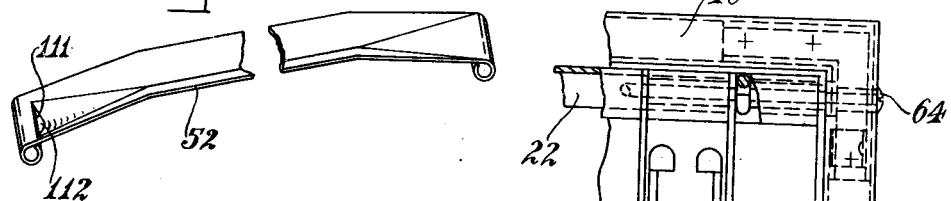
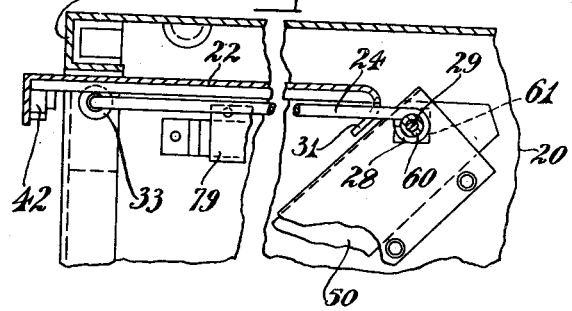
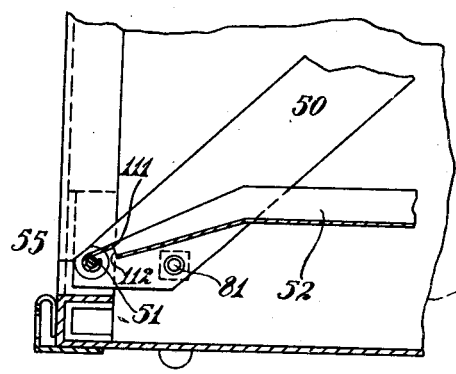
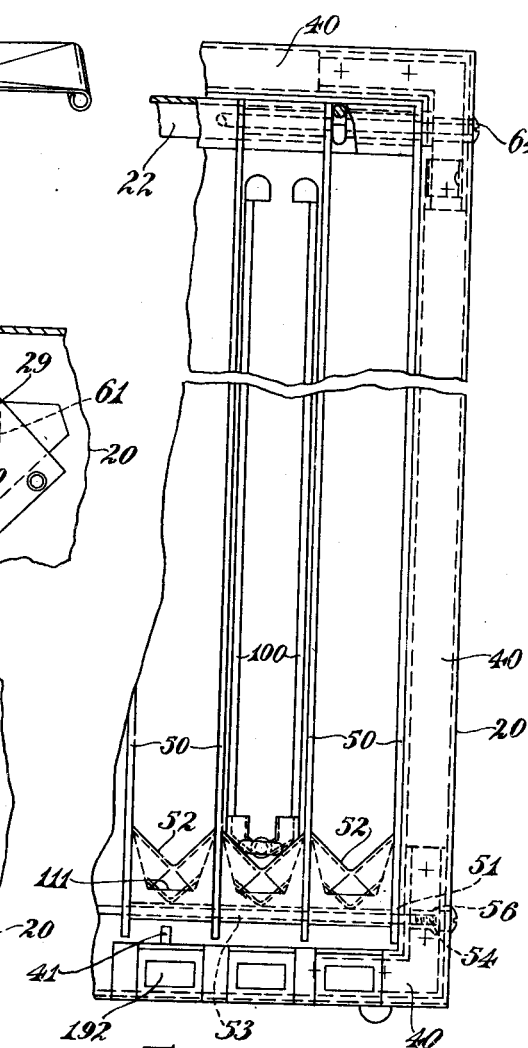

Oct. 18, 1927.
G. P. BUTLER
1,646,008
INDEX MEMORANDUM AND REFERENCE EQUIPMENT
Filed Sept. 2, 1922
6 Sheets-Sheet 4
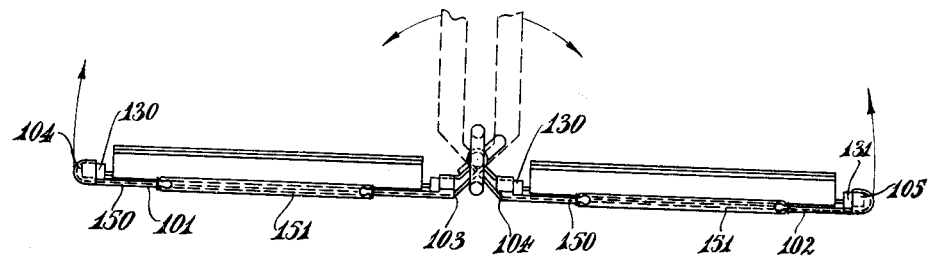
Fig. 9.
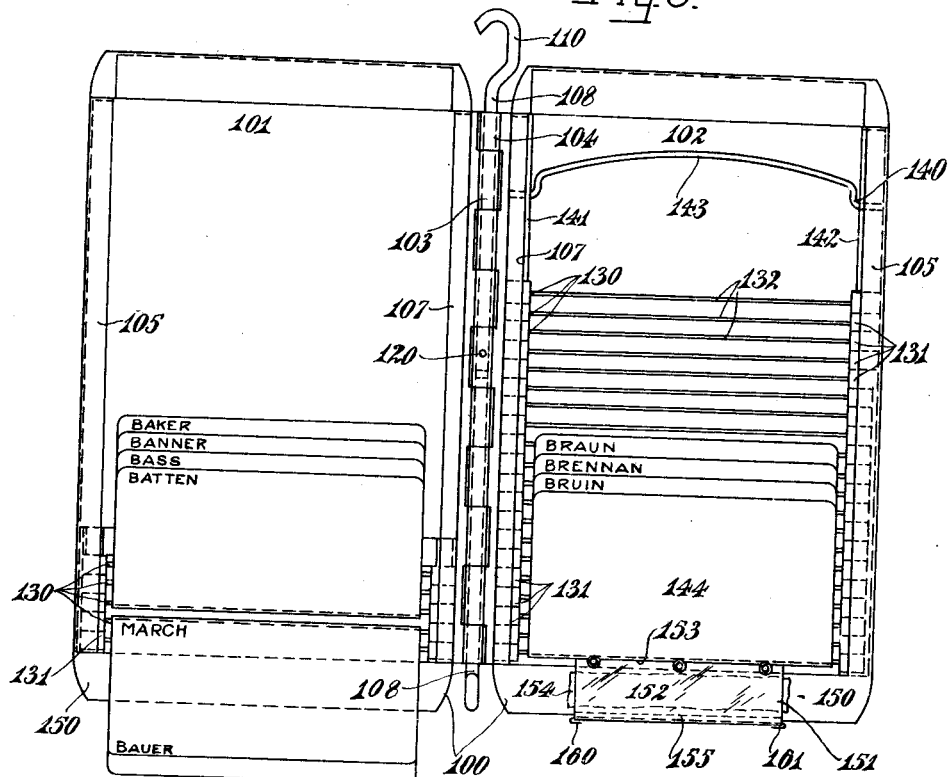
Fig. 15.
Fig. 8.
INVENTOR.
George P. Butler,
BY
Jesse A. Holton
ATTORNEY.

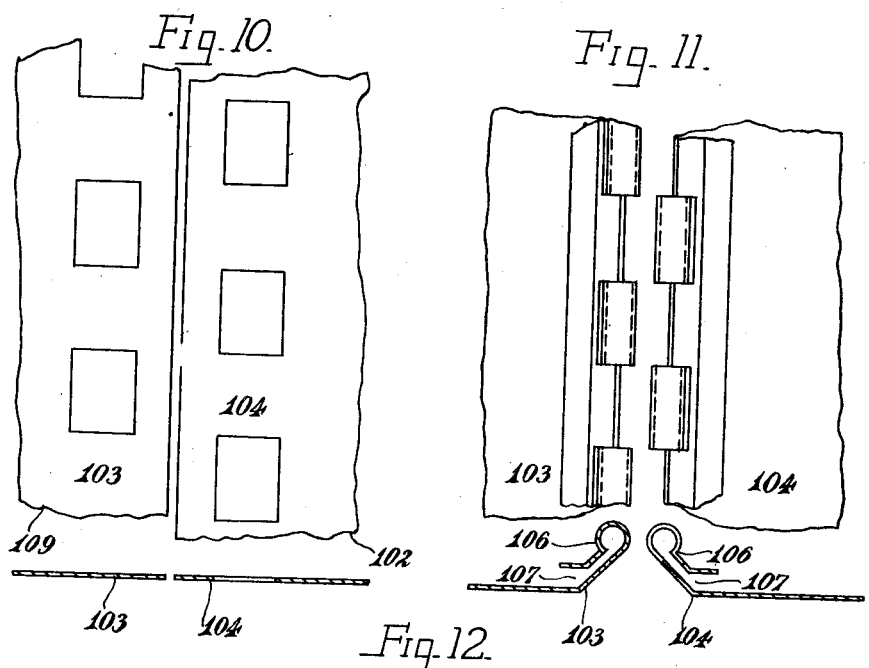
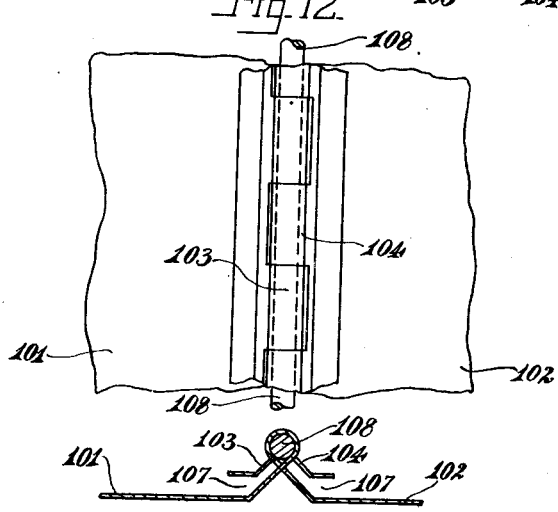

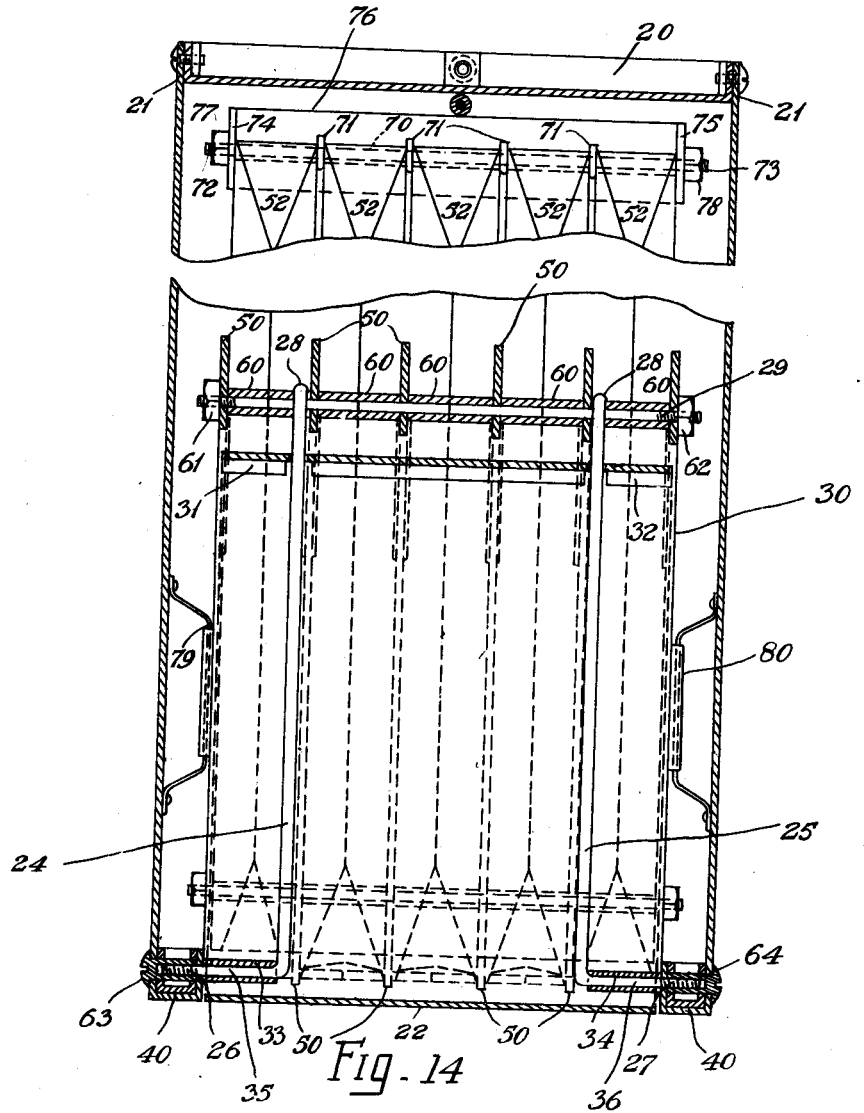

Patented Oct. 18, 1927.

1,646,008

UNITED STATES PATENT OFFICE.

GEORGE P. BUTLER, OF BOSTON, MASSACHUSETTS, ASSIGNOR, BY MESNE ASSIGNMENTS, TO POSTINDEX COMPANY, INC., OF BOSTON, MASSACHUSETTS, A CORPORATION OF MASSACHUSETTS.

INDEX, MEMORANDUM, AND REFERENCE EQUIPMENT.

Application filed September 2, 1922. Serial No. 585,935.

This invention relates to index, memorandum and reference equipment and with regard to certain more specific features thereof to leaf index panels arranged in a support or holder for quick and convenient reference and return.

The invention has for one of its objects the provision of a compact, inexpensive, dust-proof and tamper-proof container for a multiplicity of leaved panels.

The invention has for another of its objects the provision of a simple, durable and conveniently operable leaf holder, whereby a large number of indexed leaves are supported and arranged for quick reference and mounted in position to allow for inscription on any desired leaf and on either side of any desired leaf.

Another object of the invention is to provide means for associating the said leaf holder with the aforesaid container in such manner that the holder may be readily withdrawn either entirely away from the container or partially away therefrom in such fashion that while still maintaining a connection with the container and a definite relation to the chamber of the container from which it was withdrawn, the leaf holder is nevertheless capable of operation for reference and inscription. By reason of this, the leaf holder is maintained in position for quick and accurate restoration within the proper chamber of the container.

There are numerous other objects of the invention many of which are grounded in the simple, inexpensive and durable character of the parts and structures which go to make up the combinations by which the aforestated objects are realized. These will be in part obvious and in part referred to particularly hereinafter.

The invention accordingly consists in the various features of construction, combinations of elements and arrangements of parts which will be exemplified by the construction hereinafter set forth and the scope of the application of which will be indicated by the following claims:

In the accompanying drawings wherein is represented one of various possible embodiments of the invention Fig. 1 is a view in longitudinal section of the improved index, memorandum and reference device.

Fig. 4 is a view in front elevation of a portion of the cabinet or container, showing one of the leaf holders arranged in storage position within one of the individual chambers of the cabinet.

Fig. 5 is a fragmentary and sectional view of the top forward portion of the cabinet indicating the door guiding means and associated parts.

Fig. 6 is a fragmentary and sectional view of the bottom forward portion of the cabinet indicating the construction of the guiding means and skeleton chambers for the leaf holders.

Fig. 7 is a view of one of the lower guide rails and supports for the leaf holders.

Fig. 8 is a view of one of the book fashion leaf holders which preferably are employed in connection with the cabinet described. In this figure, the leaf holder is shown in open or spread position ready for the desired manipulation of the leaves.

Fig. 9 is another view of the leaf holder, looking on the front edge as the holder is seen in Fig. 8. The dotted lines in this view indicate the position of the panels as the holder is closed for return to storage.

Fig. 10 illustrates in plan and cross section, the shape of the blanks of the leaf holder at the hinge portion before the same are stamped into final form.

Fig. 11 illustrates the final form of the hinge portions of the leaf holder before these portions are associated.

Fig. 12 illustrates the hinge portions as shown in Fig. 11, after correlation and introduction of the pivot pin.

Fig. 13 is a view in cross section of the portion of the leaf holder shown in Fig. 12.

Fig. 14 is a sectional view of the cabinet taken on horizontal planes.

Fig. 15 is a detail of the index holder.

Figure 1:
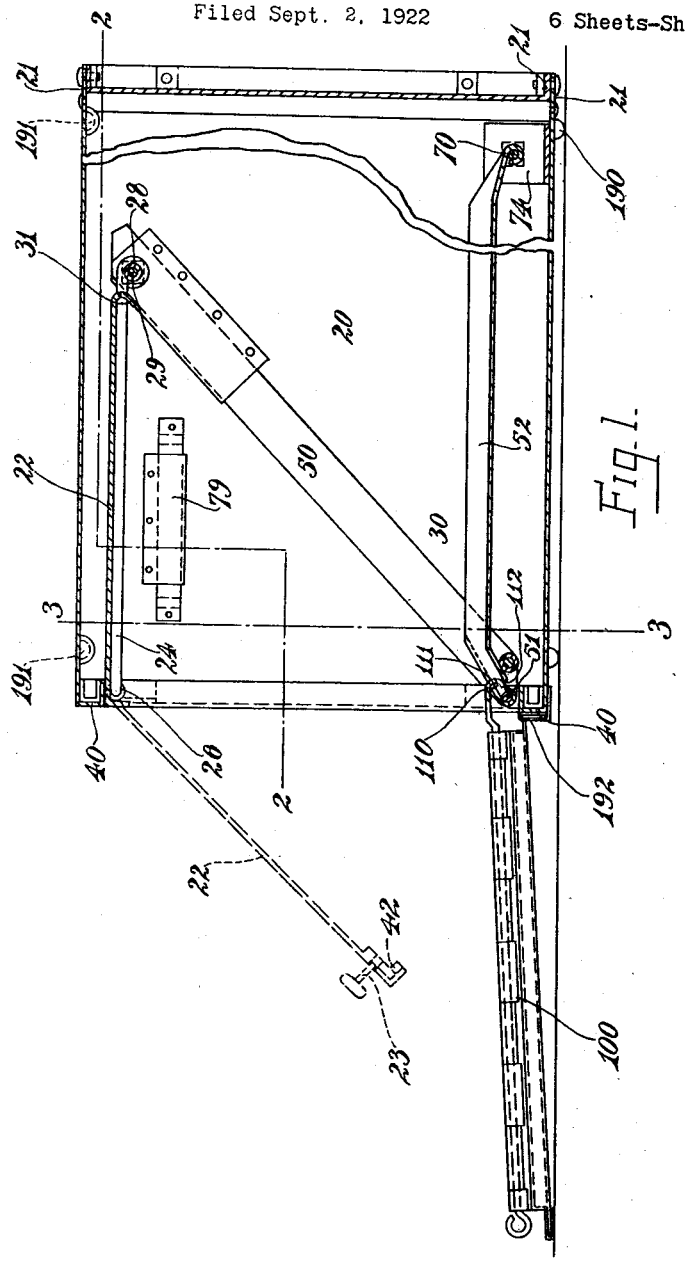

Referring now more particularly to the drawings, there is indicated at 20 a box or container body, which is constructed in the preferred embodiment illustrated herein, of sheet metal, stamped with suitable flanges 21 whereby the top, bottom, side and rear end walls are matched and secured to constitute a strong but relatively light cabinet having an open front end. To complete this cabinet in dust-proof and tamper-proof character there is provided a movable front wall or door 22, which may be provided with a key controlled lock as indicated at 23 in Fig. 1.

The arrangements providing for the mounting, opening and closing of the door, comprise a pair of guide rails 24 and 25, each of which has its forward end turned outwardly and secured at 26 and 27 to respective side walls of the cabinet. The rear end 28 of each guide rail is secured to an upper tie rod 29 of a skeleton insert frame 30 hereinafter more fully referred to. The movable front wall or door panel 22 is slidably associated with the cabinet frame 20 by arrangement between the guide rails and the top wall of the cabinet. When it is desired to lock or close the cabinet, the panel is drawn outwardly to the left, as viewed in Fig. 1, until hook portions 31 and 32 on each side of the panel at the rear, engage with stops 33 and 34, formed by the outward turns 35 and 36 of the guide rails. This allows for pivotal movement of the door panel as indicated by the dotted lines in Fig. 1, until the forward or bottom edge of the panel registers with the bottom wall of the cabinet. In this position, the door may be locked, thereby sealing the contents of the cabinet. It will be noted that the forward ends of the metal panels which go to make up the top, bottom and side walls of the cabinet body, are each formed with two right angle turns inwardly, constituting a marginal enclosure for the door which, in closed position, lies flush with the front marginal area 40 of the cabinet body making the cabinet difficult of access by irregular means. A pin 41 projecting upwardly from the horizontal inturned flange of the bottom wall is adapted to be engaged by the key actuated tumbler or hasp 42 of the door panel.

Coming now to a description of the skeleton insert frame 30 which is fitted within the cabinet just previously described. This frame is shown in Figs. 1 to 7, inclusive. It comprises in principal part a plurality of spaced stays 50 obliquely disposed, each connecting with a tie rod 51 at the forward end of the cabinet, and a plurality of supporting and guide rails 52 arranged in substantially horizontal position between juxtaposed stays. The tie rod 51 has an elongated shank portion 53 and short reduced threaded end portions 54 which penetrate the inturned flanges of the side walls of the cabinet and there receive socket screws 55 and 56, the heads of which seat against the said side walls. Viewing Figs. 4, 6 and 7 of the drawings, it will be noted that each guide rail 52 serves as a spacer between juxtaposed stays and that as all the stays and alternate guide rails are assembled, the resultant structure is secured to the outer cabinet walls by the screws 55 and 56.

Figure 2:
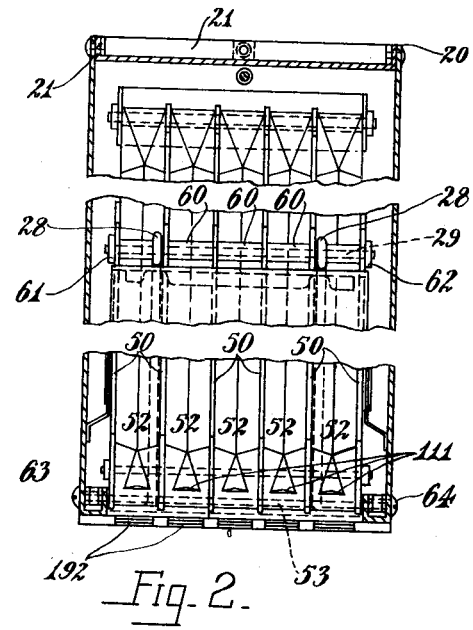
Fig. 2 is a view in section taken substantially on the line 2—2 of Fig. 1.
Figure 3:
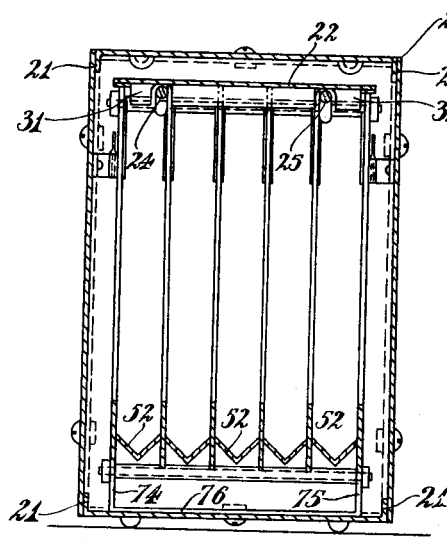
Fig. 3 is a view in section taken substantially on the line 3—3 of Fig. 1.

The stays 50 extend rearwardly and upwardly to a terminal which is constituted by another tie rod 29. The latter rod is not, however, directly attached to the side walls of the cabinet. It has an elongated shank and threaded end portions similar in form to the first mentioned tie rod. The guide rails 52 are not secured to this rod 29 and therefore, to hold the stays in proper position, sleeve spacers 60 are employed, except, as shown in Fig. 2, where they are supplemented in spacing function by the door panel guide rails 24 and 25. By means of nuts 61 and 62 threaded on the opposite ends of this tie rod, the stays, spacers and door panel guide rails are bound securely together. Here attention is directed to the previous description of these guide rails 24 and 25 which penetrate the inner flanges of the cabinet side walls and are engaged in the channels formed by said flanges, by socket screws 63 and 64 which bind them securely to the cabinet.

The horizontal guide rails 52 extend rearwardly and are associated at their rearward extremities by a third tie rod 70. Washers 71 serve as spacers on this tie rod compensating for the absence of the oblique stays of the skeleton insert, and the reduced and threaded ends 72 and 73 of this tie rod penetrate respectively, the upstanding walls 74 and 75 of a bail shaped member 76 which serves as the required prop to maintain a horizontal position of the rails 52. Nuts 77 and 78 are employed at each threaded end respectively to secure the parts associated as described. Shown particularly in Figs. 1, 2, 5 and 14 are side rails 79 and 80 which assist the oblique stays 50 in maintaining a vertical position of the leaf holders within the cabinet. The oblique stays are further tied by means of a rod 81 at the forward end of the insert.

It will be noted that the structure so far described includes a storage cabinet body with movable door, and a skeleton insert which obviously is relatively low in cost and simple in arrangement and assembly. The construction of the novel leaf holder which has been devised for correlation with this cabinet will now be set forth.

The loose leaf holder 100 is constituted by two similar but not identical panels 101 and 102. The difference in the two panels is slight and is found in the hinge portions 103 and 104 as illustrated clearly in Figs. 10, 11 and 12. In the preferred form of the invention each panel is formed of a single sheet of metal, one long side being turned to provide a channel 105 and the other long side being formed as shown in Fig. 11 to form an inter-fitting hinge portion 106 and also a channel 107 opposed to the one first mentioned. Associating of the panels as shown in Fig. 12 and the passing through of the pivot pin or hinge pintle 108 provides a loose leaf holder of book form adapted to receive a multiplicity of leaves or cards on each panel and further adapted to be opened for reference and inscription or the insertion or withdrawal of cards; or to be closed in compact condition for storage. At the upper edge of the panel, the hinge pintle is provided with an extension 110 of hook formation. By means of this hook, the leaf holder may be engaged as it is withdrawn from the cabinet, with a shoulder 111 formed by stamping a depression or opening 112 in the forward end of the guide rail 52. (See Figs. 1 and 7.) In this position the leaf holder may be opened to position for manipulation of the leaves or cards, the lower edge of the leaf holder under frequent circumstances, resting upon the table or shelf which also serves to support the cabinet. In this manner the leaf holder is maintained in association with the skeletonized insert of the cabinet and the particular pocket or skeleton compartment from which it was withdrawn. After the reference has been concluded, the book or holder may, by a simple movement, be closed and restored to position of storage. The hinge pintle is secured to one panel as indicated at 120 so that the hook has a definite relationship to the holder in open or closed positions. If desired certain of the hinge extensions of the panels may be supplemented by clips of metal, not as susceptible to scratches as the aluminum alloy of which the panels are made, thereby providing shoes to engage the guide rails 52 as the leaf holder is moved relatively thereto.

Coming on now to the particular construction of the panels 101 and 102 it is to be noted that the opposed channels 105 and 107 are adapted to receive a multiplicity of flexible card-carrying members 130. Each of these comprises a short cylindrical plug or pivot pin 131 at either end, connected by a wire 132. Each wire is adapted to have secured to it a card or sheet either by attaching the card along its lower edge or by folding a sheet at its middle and reeving the sheet at the fold on the wire. In either event, the cards or sheets being of uniform size, the distance between adjacent wires on the panel governs the distance by which one card or sheet will extend at its free edge beyond the free edge of the next card or sheet and the distance between the wires is governed by the diameter of the short cylindrical pivot members at the ends of the wires. This arrangement produces a series of sheets in substantially flat and lapping positions resulting in successive exposures of marginal areas for index purposes. It is further to be noted that if the sheet series is reversed as by a movement of them 180°, the reverse sides of the cards or sheets present a corresponding succession of marginal areas. The index characters may therefore be placed on either side of the leaves near the free edge and read with equal convenience whether the leaves be in the "up" position as shown in Fig. 8 or in the "down" position resulting from a pivotal movement about or with the wires 132.

A flexible spacer 140 is removably attachable to the panels to retain the wires in proper position therein.

This comprises a pair of space bars 141 and 142 respectively arranged in opposed channels of each panel at the top, and connected by a flexible wire 143. At the bottom of each panel on the lowermost wire, there is arranged a metal plate 144 serving as a cover plate for the exposed leaf of the series and also as a reinforcing panel for the lower leaves of the series should one desire to inscribe the reverse side of these leaves.

At the bottom edge 150 of each leaf panel where as at the top also, the metal is turned back upon itself to produce a double thickness, an index holder 151 is arranged. This holder comprises a square 152 of transparent material such as celluloid doubled along the middle to extend equally over front and rear surfaces of the panel. The inner edges 153 are secured as by riveting, leaving a loose fit of the celluloid upon the panel whereby a character card 154 may be inserted and by pressure retained in position. In order to get the maximum effectiveness of this arrangement and avoid breakage of the celluloid square, I construct the square with a curved reinforcing strip 155 of thin metal, the strip being held in position against the inner side of the square, by extended ends 160 and 161 which are turned over and pressed against the outer side of the celluloid as shown in Figs. 8 and 15.

The cabinet 20 has provision for vertical stacking with other like cabinets (see Fig. 1, the projections and depressions 190 and 191). Also the lower front marginal area of the cabinet casing has pockets 192 to receive and retain character cards.

As many changes could be made in the above construction, and many apparently widely different embodiments of the invention might be made without departing from the scope thereof, it is intended that everything contained in the foregoing description or shown in the accompanying drawings shall be interpreted as illustrative and not in a limiting sense.

Having thus described the nature of the said invention and the best means I know of carrying the same into practical effect, I claim:—

1. In a filing and reference device, the combination with a walled container having a movable front wall serving as a door, of a skeleton insert comprising as a unit a plurality of guide rails for the door in its movement, a plurality of vertical plane partitions, horizontal plane guide rails between adjacent partitions, and transverse tie rods for said partitions and guide rails.

2. A walled container, a skeleton insert therefor comprising horizontal plane guide rails and vertical plane partitions, individual book-form leaf holders filed with their hinged edges engaging said rails, and catch means controlling the removal of said leaf holders whereby they may be brought into use for reference and inscription while maintained in definite relation to the skeleton insert and the particular chambers from which they are respectively withdrawn.

3. In a paper file, the combination of a set of paper-filing panels, and a casing in which said panels are received on edge, and a skeleton framework constituting an inner shell within the casing to receive said panels, said framework presenting a set of V-grooves in which the lower edges of said panels are received.

4. In a paper file, the combination of a set of paper-filing panels, and a casing in which said panels are received vertically, means presenting a set of grooves by which the lower edges of said panels are guided, and a set of bars separating said panels and inclined in a rearward direction whereby to provide guides for the side walls of said panels.

GEORGE P. BUTLER.